(12) United States Patent
Bullivant et al.

(10) Patent No.: US 12,312,561 B2
(45) Date of Patent: *May 27, 2025

(54) WATER-SOLUBLE UNIT DOSE ARTICLE (71) Applicant: The Procter & Gamble Company, Cincinnati, OH (US)

(72) Inventors: Timothy Bullivant, Newcastle upon Tyne (GB); Nicholas Alexander Jesse McGuckin, Newcastle upon Tyne (GB); Helen Amy Lang, Newcastle upon Tyne (GB); Eric San Jose Robles, Newcastle upon Tyne (GB); Hossam Hassan Tantawy, Morpetht (GB)

(73) Assignee: The Procter & Gamble Company, Cincinnati, OH (US)

( * ) Notice: Subject to any disclaimer, the term of this patent is extended or adjusted under 35 U.S.C. 154(b) by 349 days.

This patent is subject to a terminal disclaimer.

(21) Appl. No.: 17/855,102

(22) Filed: Jun. 30, 2022

(65) Prior Publication Data

US 2022/0356419 A1 Nov. 10, 2022

Related U.S. Application Data (63) Continuation of application No. PCT/US2021/035098, filed on Jun. 1, 2021.

(30) Foreign Application Priority Data

Jun. 1, 2020 (EP) .................................... 20177724

(51) Int. Cl.
C11D 17/00 (2006.01)
C08L 29/04 (2006.01)
C11D 17/04 (2006.01)

(52) U.S. Cl.
CPC ............ *C11D 17/044* (2013.01); *C08L 29/04* (2013.01)

(58) Field of Classification Search
None
See application file for complete search history.

(56) References Cited

U.S. PATENT DOCUMENTS

| 4,681,228 A | 7/1987 | Kerry |
| 5,224,601 A | 7/1993 | Gouge et al. |
| 6,834,480 B1 | 12/2004 | Ishino et al. |
| 8,671,952 B2 | 3/2014 | Winterson |
| 9,163,205 B2 | 10/2015 | Sivik et al. |
| 10,513,588 B2 | 12/2019 | Friedrich et al. |

(Continued)

FOREIGN PATENT DOCUMENTS

| CN | 108004070 A | 5/2018 |
| CN | 109592133 A | 4/2019 |

(Continued)

OTHER PUBLICATIONS

All Office Actions; U.S. Appl. No. 17/855,125, filed Jun. 30, 2022.

(Continued)

*Primary Examiner* — Necholus Ogden, Jr.
(74) *Attorney, Agent, or Firm* — Gary J. Foose; George H. Leal (57) ABSTRACT A water-soluble unit dose article including a water-soluble fibrous non-woven and a method of using the water-soluble unit dose article.

20 Claims, 1 Drawing Sheet

(56) References Cited

U.S. PATENT DOCUMENTS

| | | | |
|---|---|---|---|
| 2011/0036364 A1 | 2/2011 | Pienemann | |
| 2012/0048769 A1 | 3/2012 | Sivik | |
| 2015/0071572 A1 | 3/2015 | Dreher | |
| 2016/0304230 A1 | 10/2016 | Tyner | |
| 2017/0029747 A1 | 2/2017 | Depoot | |
| 2017/0233539 A1 | 8/2017 | Monosol | |
| 2017/0355935 A1 | 12/2017 | Courchay et al. | |
| 2018/0216052 A1* | 8/2018 | Denome | C11D 3/3723 |
| 2019/0134938 A1 | 5/2019 | Farkas | |
| 2019/0233782 A1 | 8/2019 | Sivik | |
| 2019/0233785 A1 | 8/2019 | Sivik | |
| 2020/0102524 A1 | 4/2020 | Dreher et al. | |
| 2020/0190446 A1 | 6/2020 | Sivik et al. | |
| 2021/0222088 A1 | 7/2021 | Sivik et al. | |
| 2022/0333045 A1 | 10/2022 | Bullivant et al. | |
| 2022/0333046 A1 | 10/2022 | Bullivant et al. | |
| 2023/0002132 A1 | 1/2023 | Bridewell | |
| 2023/0265360 A1 | 8/2023 | Bullivant et al. | |
| 2023/0265365 A1 | 8/2023 | Bullivant et al. | |

FOREIGN PATENT DOCUMENTS

| | | |
|---|---|---|
| CN | 209493544 U | 10/2019 |
| CN | 111088129 A | 5/2020 |
| DE | 4216193 A1 | 11/1992 |
| EP | 0676329 A1 | 10/1995 |
| EP | 1048722 A1 | 11/2000 |
| EP | 2258820 A1 | 12/2010 |
| EP | 2502980 A1 | 9/2012 |
| EP | 3138899 A1 | 3/2017 |
| EP | 3919601 A1 | 12/2021 |
| JP | H108098 A | 1/1998 |
| JP | 2001294899 A | 10/2001 |
| TW | 404994 B | 9/2000 |
| WO | 0240351 A1 | 5/2002 |
| WO | 03044155 A1 | 5/2003 |
| WO | 2008068779 A2 | 6/2008 |
| WO | 2013103630 A1 | 7/2013 |
| WO | 2017106004 A1 | 6/2017 |

OTHER PUBLICATIONS

All Office Actions; .U.S. Appl. No. 17/855,158, filed Jun. 30, 2022.
Extended EP Search Report and Written Opinion for 20177724.0 dated Nov. 11, 2020, 9 Pages.
Extended EP Search Report and Written Opinion for 21177113.4 dated Sep. 29, 2021; 8 Pages.
PCT Search Report and Written Opinion for PCT/US2021/035098 dated Aug. 25, 2021, 14 pages.
Sekisui: "Selvol polyvinyl Alchohol polymer Brochure", Mar. 31, 2015, XP055745503, Retrieved from the internet: URL:https://www.sekisui-sc.com/wp-content/uploads/SelvoIPVOH_Brochure_EN.pdf, Retrieved on Oct. 30, 2020; 9 Pages.
All Office Actions: U.S. Appl. No. 18/113,731, filed Feb. 24, 2023.
All Office Actions; U.S. Appl. No. 18/113,734, filed Feb. 24, 2023.

* cited by examiner

WATER-SOLUBLE UNIT DOSE ARTICLE

FIELD OF THE INVENTION

A water-soluble unit dose article comprising a water-soluble fibrous non-woven and a method of using said water-soluble unit dose article

BACKGROUND OF THE INVENTION

Water-soluble unit dose article are liked by consumers due to their convenience and ease of use.

Without wishing to be bound by theory, the water-soluble unit dose article comprises a water-soluble sheet and a unitized dose of a laundry detergent composition which is housed within one or more compartments within the unit dose article. Upon addition to water, the water-soluble sheet dissolves and/or disintegrates and releases the detergent composition into the water.

However, an issue encountered with water-soluble unit dose articles is that often they need to be added to the drum of the automatic laundry washing machine to ensure complete dissolution during the wash. If they are added to the drawer of the automatic laundry washing machine they can suffer from incomplete dissolution which can leave residues in the drawer and/or on the fabrics being laundered.

Whilst a simple solution to this problem is to add the water-soluble unit dose article to the drum, there are certain consumers who do not like to add the water-soluble unit dose article to the drum, as they prefer the dissolution of the water-soluble unit dose article to occur in the drawer of the automatic laundry washing machine before contacting the fabrics with the detergent composition.

It was surprisingly found that the water-soluble laundry unit dose article according to the present invention provided excellent dissolution when added to the drawer as well as the drum of the automatic laundry washing machine.

SUMMARY OF THE INVENTION

A first aspect of the present invention is a water-soluble unit dose article comprising a water-soluble fibrous non-woven sheet and a granular laundry detergent composition, wherein the granular laundry detergent composition comprises at least a first plurality of particles; wherein the water-soluble fibrous non-woven sheet is shaped to form a sealed internal compartment, wherein the granular detergent composition is comprised within said internal compartment; and wherein the water-soluble fibrous non-woven sheet comprises a plurality of fibres; wherein the fibres comprise polyvinyl alcohol polymer and wherein the polyvinyl alcohol polymer has an average molecular weight of 100 kDa or less.

A second aspect of the present invention is a process for laundering fabrics, comprising the steps,
a. providing an automatic laundry washing machine wherein the automatic laundry washing machine comprises a drum and a drawer;
b. adding the water-soluble unit dose article according to any preceding claims to the drawer, the drum or a mixture thereof and adding fabrics to be washing to the drum;
c. starting a wash operation in the automatic laundry washing machine.

DETAILED DESCRIPTION OF THE INVENTION

Water-Soluble Unit Dose Article

The present invention is a water-soluble unit dose article comprising a water-soluble fibrous non-woven sheet and a granular laundry detergent composition. The fibrous non-woven sheet and the granular laundry detergent composition are described in more detail below.

The water-soluble fibrous non-woven sheet is shaped to form a sealed internal compartment, wherein the granular laundry detergent composition is comprised within said internal compartment.

The unit dose article may comprise a first fibrous non-woven sheet and a second water-soluble fibrous non-woven sheet sealed to one another such to define the internal compartment. The water-soluble unit dose article is constructed such that the granular detergent composition does not leak out of the compartment during storage. However, upon addition of the water-soluble unit dose article to water, the water-soluble non-woven fibrous sheet dissolves and releases the contents of the internal compartment into the wash liquor.

The compartment should be understood as meaning a closed internal space within the unit dose article, which holds the granular detergent composition. During manufacture, a first water-soluble fibrous non-woven sheet may be shaped to comprise an open compartment into which the detergent composition is added. A second water-soluble fibrous non-woven sheet may then be laid over the first sheet in such an orientation as to close the opening of the compartment. The first and second sheets are then sealed together along a seal region.

Alternatively, a single water-soluble fibrous non-woven may be shaped into an open container. The granular laundry detergent composition may then be filled into the open container and then the open container sealed to close it.

The unit dose article may comprise more than one compartment, even at least two compartments, or even at least three compartments. The compartments may be positioned in a side-by-side orientation, i.e. one orientated next to the other. Alternatively, one compartment may be completely enclosed within another compartment.

Wherein the unit dose article comprises at least two compartments, one of the compartments may be smaller than the other compartment.

Each compartment may comprise the same or different compositions.

Figure 1:
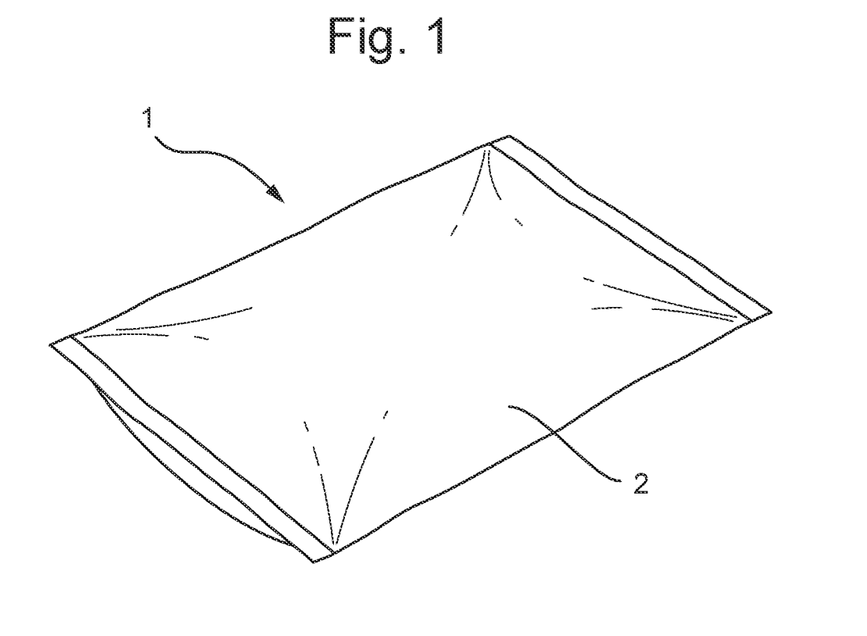
FIG. 1 Water-soluble unit dose article according to the present invention

FIG. 1 discloses a water-soluble unit dose article (1) according to the present invention. The water-soluble unit dose article (1) shown has a generally rectangular shape, however it may have any suitable shape including, square, triangular, circular, oval, hexagonal or a mixture thereof. The water-soluble unit dose article (1) comprises a water-soluble fibrous non-woven sheet (2).

Figure 2:
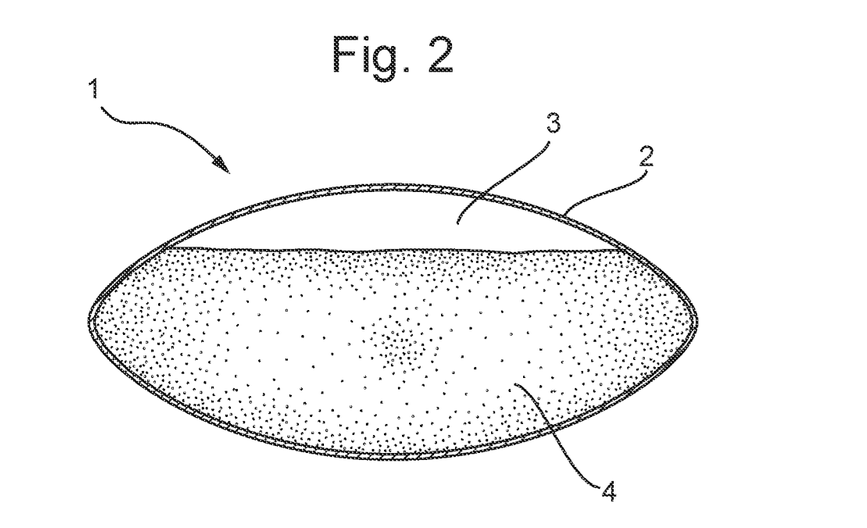
FIG. 2 Cross-section of a water-soluble unit dose article according to FIG. 1

As can be seen from FIG. 2 which is a cross-sectional diagram of the water-soluble unit dose article (1) of FIG. 1, the water-soluble fibrous non-woven sheet (2) is shaped to create at least one internal compartment (3) containing the granular laundry detergent composition (4).

Water-Soluble Fibrous Non-Woven Sheet

The water-soluble unit dose article comprises a water-soluble fibrous non-woven sheet. The water-soluble fibrous non-woven sheet comprises a plurality of fibres. Preferably, the fibres are inter-entangled fibres in the form of a fibrous structure.

The water-soluble fibrous non-woven sheet may be homogeneous or may be layered. If layered, the water-soluble fibrous non-woven sheet may comprise at least two and/or at least three and/or at least four and/or at least five layers.

Preferably, the water-soluble fibrous non-woven sheet has a basis weight of between 20 gsm and 60 gsm, preferably between 20 gsm and 55 gsm, more preferably between 25 gsm and 50 gsm, most preferably between 25 gsm and 45 gsm. Those skilled in the art will be aware of methods to measure the basis weight.

Basis weight of a water-soluble fibrous non-woven sheet may be measured on stacks of twelve usable units using a top loading analytical balance with a resolution of ±0.001 g. The balance is protected from air drafts and other disturbances using a draft shield. A precision cutting die, measuring 8.9 cm±0.009 cm by 8.9 cm±0.009 cm is used to prepare all samples.

With a precision cutting die, cut the samples into squares. Combine the cut squares to form a stack where the stack is twelve samples thick. Measure the mass of the sample stack and record the result to the nearest 0.001 g.

The Basis Weight is calculated in $g/m^2$ (gsm) as follows:

$$\text{Basis Weight} = \text{(Mass of stack)}/[(\text{Area of 1 square in stack}) \times (\text{No. of squares in stack})]$$

By 'fibre' we herein mean an elongated element having a length exceeding its average diameter, preferably, a length to average diameter ratio of at least about 10.

Preferably, each fibre may have a length of greater than or equal to 5.08 cm, greater than or equal to 7.62 cm, greater than or equal to 10.16, greater than or equal to 15.24 cm or a mixture thereof.

Alternatively, each fibre may have length of less than 5.08 cm, less than 3.81 cm, less than 2.54 cm, or a mixture thereof.

Each fibre may have a width of less than 100 µm, less than 75 µm, less than 50 µm, less than 25 µm, less than 10 µm, less than 5 µm, less than 1 µm or a mixture thereof. Those skilled in the art will be aware of standard methods and techniques to measure the width. Preferred methods include Scanning Electron Microscope (SEM) or an Optical Microscope together with image analysis software.

The water-soluble fibrous non-woven sheet may comprise a plurality of identical or substantially identical, from a compositional perspective, fibres. Alternatively, the water-soluble fibrous non-woven sheet may comprise two or more different fibres according to the present invention. Non-limiting examples of differences in the fibres may be physical differences such as differences in diameter, length, texture, shape, rigidness, elasticity, and the like; chemical differences such as crosslinking level, solubility, melting point, Tg, active agent.

Preferably, the fibres are present between 80% and 95%, preferably between 85% and 93%, more preferably between 87% and 90% by weight of the water-soluble fibrous non-woven sheet.

The water-soluble fibrous non-woven sheet may exhibit different regions, such as different regions of basis weight, density, and/or caliper. The water-soluble fibrous non-woven sheet may comprise texture on one or more of its surfaces.

A surface of the water-soluble fibrous non-woven sheet may comprise a pattern, such as a non-random, repeating pattern.

The water-soluble fibrous non-woven sheet may have a thickness between 0.01 mm and 100 mm, preferably between 0.05 mm and 50 mm, more preferably between 0.1 mm and 20 mm, even more preferably between 0.1 mm and 10 mm, even more preferably between 0.1 mm and 5 mm, even more preferably between 0.1 mm and 2 mm, even more preferably between 0.1 mm and 0.5 mm, most preferably between 0.1 mm and 0.3 mm Those skilled in the art will be aware of standard methods to measure the thickness.

The fibres comprise polyvinyl alcohol polymer. Preferably, the fibres comprises between 50% and 98%, preferably between 65% and 97%, more preferably between 80% and 96%, even more preferably between 88% and 96% by weight of the fibre of polyvinyl alcohol.

The polyvinyl alcohol polymer has an average molecular weight of 70 kDa or less, preferably between 5 kDa and 70 kDa, more preferably between 7 kDa and 65 kDa, most preferably between 10 kDa and 60 kDa. Without wishing to be bound by theory, it is the specific choice of a fibrous non-woven comprising fibres comprising a polyvinyl alcohol polymer having the specific MW claimed herein that addressed the problem to be solved. Those skilled in the art will be aware of known techniques to determine the molecular weight (MW).

Preferably, the polyvinyl alcohol polymer is a polyvinyl alcohol homopolymer. Preferably, the polyvinyl alcohol homopolymer has an average percentage degree of hydrolysis of from 75% to 100%, preferably of from 80% to 95%, most preferably of from 85% to 90%. Preferably, the polyvinyl alcohol homopolymer has an average viscosity of from 1 to 30 mPas, preferably from 5 to 25 mPas, most preferably from 10 to 20 mPas, wherein the viscosity is measured as a 4% aqueous solution in demineralized water at 20° C.

The fibres preferably comprise between 0.1% and 15% by weight of the fibres of a gel-breaker, wherein the gel-breaker is selected from polyols, sugar alcohols, amines, amides, carbohydrates, multivalent cations, or a mixture thereof, preferably polyols, sugar alcohols or a mixture thereof. Preferably, the fibres comprise between 1% and 12%, preferably between 2% and 10% by weight of the fibres of the gel-breaker.

Without wishing to be bound by theory, polyols are synthetic materials, whilst sugar alcohols are natural materials. Sugar alcohols may comprises ribose, xylose, fructose of a mixture thereof.

Preferably, the gel-breaker is selected from glycerol, polyethylene glycol, 1,2-propanediol, dipropylene glycol, 2-methyl-1,3-propanediol, trimethylpropanol, triethylene glycol, polyethylene glycol, sorbitol, cyclohexanedimethanol, hexylene glycol, dipropylene glycol n-butyl ether, 2-Methyl-2,4-pentanediol, polypropyleneglycol, urea, formamide, ethanolamine, carbohydrates, dianhydrohexitol, Magnesium chloride, sodium chloride, and mixtures thereof, preferably selected from polyethylene glycol, glycerol, sorbitol, trimethylpropanol, dipropylene glycol, and mixtures thereof.

Preferably, the fibres comprise between 0.1% and 15%, preferably between 1% and 12%, more preferably between 2% and 10% by weight of the fibres of a gel-breaker selected from glycerol, polyethylene glycol, 1,2-propanediol, dipropylene glycol, 2-methyl-1,3-propanediol, trimethylpropanol, triethylene glycol, polyethylene glycol, sorbitol, cyclohexanedimethanol, hexylene glycol, dipropylene glycol n-butyl ether, 2-Methyl-2,4-pentanediol, polypropyleneglycol, urea, formamide, ethanolamine, carbohydrates, dianhydrohexitol, Magnesium chloride, sodium chloride, and mixtures thereof, preferably, the fibres comprise between 0.1% and 15%, preferably between 1% and 12%, more preferably between 2% and 10% by weight of the fibres of a gel-breaker selected from polyethylene glycol, glycerol, sorbitol, trimethylpropanol, dipropylene glycol, and mixtures thereof.

Preferably, the fibres comprise between 0.1% and 15%, preferably between 1% and 12%, more preferably between 2% and 10% by weight of the fibres of the gel-breaker and wherein the fibres comprise between 0.1% and 15%, preferably between 1% and 12%, more preferably between 2% and 10% by weight of the fibres of a gel-breaker selected from glycerol, polyethylene glycol, 1,2-propanediol, dipropylene glycol, 2-methyl-1,3-propanediol, trimethylpropanol, triethylene glycol, polyethylene glycol, sorbitol, cyclohexanedimethanol, hexylene glycol, dipropylene glycol n-butyl ether, 2-Methyl-2,4-pentanediol, polypropyleneglycol, urea, formamide, ethanolamine, carbohydrates, dianhydrohexitol, Magnesium chloride, sodium chloride, and mixtures thereof. Preferably, the fibres comprise between 0.1% and 15%, preferably between 1% and 12%, more preferably between 2% and 10% by weight of the fibres of the gel-breaker and wherein the fibres comprise between 0.1% and 15%, preferably between 1% and 12%, more preferably between 2% and 10% by weight of the fibres of a gel-breaker selected from polyethylene glycol, glycerol, sorbitol, trimethylpropanol, dipropylene glycol, and mixtures thereof.

Preferably, the polyethylene glycol has a molecular weight of between 100 and 800, preferably between 200 and 750, more preferably between 400 and 700, even more preferably between 500 and 650.

The fibrous non-woven sheet may comprise a second plurality of particles. Without wishing to be bound by theory, the fibrous non-woven sheet comprises gaps or space between the fibres. When present, the second plurality of particles are present, they preferably reside within the gaps/spaces between the fibres. Preferably, the second plurality of particles are present between 0.25% and 10%, preferably between 0.5% and 5%, more preferably between 1% and 3% by weight of the water-soluble fibrous non-woven sheet. Those skilled in the art will be aware of methods to determine the weight percentage of the second plurality of particles. A preferred method involves the following steps; both sides of the fibrous non-woven sheet are carefully separated from a detergent filled unit dose article. Each side is separately weighed. Initial weight (ladened with particle) is recorded. The particle laden fabric is placed on a sieve and a dry air compressed line is blown through the fibrous non-woven sheet to remove all lodged particles. The weight of the fibrous nonwoven is remeasured to obtain the difference. The weight difference is recorded as ((initial weight−final weight)/initial weight)×100 (recorded as weight percentage).

Preferably, the second plurality of particles comprise zeolite, inorganic salts, surfactant granules or a mixture thereof. Preferably, the inorganic salts comprise sodium carbonate, sodium chloride, sodium sulphate or a mixture thereof. Preferably, the surfactant granules may comprise spray dried surfactant granules, agglomerated surfactant granules or a mixture thereof.

Preferably the second plurality of particles have an average particle size distribution of between 1 micron and 150 microns, preferably between 5 microns and 125 microns, more preferably between 10 microns and 100 microns.

Preferably, the fibres comprise less than 5%, more preferably less than 3%, even more preferably less than 2% by weight of the fibres of water.

The fibres may be made by any suitable process. The fibres may be spun from a filament-forming composition using techniques known to those in the art. Suitable spinning process operations may include meltblowing, spunbonding, electro-spinning, rotary spinning or mixtures thereof.

A non-limiting example of a suitable process for making the fibres comprises the steps of:
a. providing a filament-forming composition, such as from a tank; and
b. spinning the filament-forming composition, such as via a spinning die, into one or more fibres; and
c. collecting the fibres onto a collection device, such as a patterned belt.

The filament-forming composition may be transported via suitable piping, with or without a pump, between the tank and the spinning die. The spinning die may comprise a plurality of fibre-forming holes that include a melt capillary encircled by a concentric attenuation fluid hole through which a fluid, such as air, passes to facilitate attenuation of the filament-forming composition into a fibre as it exits the fibre-forming hole.

The filament-forming composition may be spun into one or more fibres by any suitable spinning process, such as meltblowing, spunbonding, electro-spinning, and/or rotary spinning. The filament-forming composition may be spun into a plurality of fibres by meltblowing. For example, the filament-forming composition may be pumped from a tank to a meltblown spinnerette. Upon exiting one or more of the fibre-forming holes in the spinnerette, the filament-forming composition is attenuated with air to create one or more fibres. The fibres may then be dried to remove any remaining solvent used for spinning, such as the water.

The fibres may be collected on a belt, such as a patterned belt to form a fibrous non-woven sheet comprising the fibres.

Preferably, fibrous nonwoven sheets are made by bonding or interlocking fibers by mechanical, thermal, chemical, or solvent means. When fibrous nonwoven sheets are made from staple fibers, their production involves the formation of a uniform web by a wet-laid process or carding, followed by bonding the nonwovens either thermally or by other means such as needle punching, hydroentangling, etc. Spun-laid fibrous nonwovens are made in one continuous process where fibers are spun and then directly dispersed into a web by deflectors or air streams. Melt-blown fibrous nonwoven is a one-step process in which high-velocity air blows a molten thermoplastic resin from an extruder die tip on to a conveyor or take-up screen to form a fine fibrous and self-bonded web.

Granular Laundry Detergent Composition

The granular laundry detergent composition comprises a first plurality of particles. Typically, the granular laundry detergent composition is a fully formulated laundry detergent composition, not a portion thereof such as a spray-dried or agglomerated particle that only forms part of the laundry detergent composition. However, it is within the scope of the present invention for an additional rinse additive composition (e.g. fabric conditioner or enhancer), or a main wash additive composition (e.g. bleach additive) to also be used in combination with the laundry detergent composition during the method of the present invention. Although, it may be preferred for no bleach additive composition is used in combination with the granular detergent composition during the method of the present invention.

Preferably, the first plurality of particles comprises blown powder particles, agglomerated particles, extruded particles, enzyme prills or a mixture thereof.

Typically, the granular laundry detergent composition comprises a plurality of chemically different particles, such as spray-dried base detergent particles and/or agglomerated base detergent particles and/or extruded base detergent particles, in combination with one or more, typically two or more, or three or more, or four or more, or five or more, or six or more, or even ten or more particles selected from: surfactant particles, including surfactant agglomerates, surfactant extrudates, surfactant needles, surfactant noodles, surfactant flakes; polymer particles such as cellulosic polymer particles, polyester particles, polyamine particles, terephthalate polymer particles, polyethylene glycol polymer particles; builder particles, such as sodium carbonate and sodium silicate co-builder particles, phosphate particles, zeolite particles, silicate salt particles, carbonate salt particles; filler particles such as sulphate salt particles; dye transfer inhibitor particles; dye fixative particles; bleach particles, such as percarbonate particles, especially coated percarbonate particles, such as percarbonate coated with carbonate salt, sulphate salt, silicate salt, borosilicate salt, or any combination thereof, perborate particles, bleach catalyst particles such as transition metal bleach catalyst particles, or oxaziridinium-based bleach catalyst particles, pre-formed peracid particles, especially coated pre-formed peracid particles, and co-bleach particles of bleach activator, source of hydrogen peroxide and optionally bleach catalyst; bleach activator particles such as oxybenzene sulphonate bleach activator particles and tetra acetyl ethylene diamine bleach activator particles; chelant particles such as chelant agglomerates; hueing dye particles; brightener particles; enzyme particles such as protease prills, lipase prills, cellulase prills, amylase prills, mannanase prills, pectate lyase prills, xyloglucanase prills, bleaching enzyme prills, cutinase prills and co-prills of any of these enzymes; clay particles such as montmorillonite particles or particles of clay and silicone; flocculant particles such as polyethylene oxide particles; wax particles such as wax agglomerates; perfume particles such as perfume microcapsules, especially melamine formaldehyde-based perfume microcapsules, starch encapsulated perfume accord particles, and pro-perfume particles such as Schiff base reaction product particles; aesthetic particles such as coloured noodles or needles or lamellae particles, and soap rings including coloured soap rings; and any combination thereof.

The granular laundry detergent composition typically comprises detergent ingredients. Suitable detergent ingredients include: detersive surfactants including anionic detersive surfactants, non-ionic detersive surfactants, cationic detersive surfactants, zwitterionic detersive surfactants, amphoteric detersive surfactants, and any combination thereof; polymers including carboxylate polymers, polyethylene glycol polymers, polyester soil release polymers such as terephthalate polymers, amine polymers, cellulosic polymers, dye transfer inhibition polymers, dye lock polymers such as a condensation oligomer produced by condensation of imidazole and epichlorhydrin, optionally in ratio of 1:4:1, hexamethylenediamine derivative polymers, and any combination thereof; builders including zeolites, phosphates, citrate, and any combination thereof; buffers and alkalinity sources including carbonate salts and/or silicate salts; fillers including sulphate salts and bio-filler materials; bleach including bleach activators, sources of available oxygen, pre-formed peracids, bleach catalysts, reducing bleach, and any combination thereof; chelants; photobleach; hueing agents; brighteners; enzymes including proteases, amylases, cellulases, lipases, xylogucanases, pectate lyases, mannanases, bleaching enzymes, cutinases, and any combination thereof; fabric softeners including clay, silicones, quaternary ammonium fabric-softening agents, and any combination thereof; flocculants such as polyethylene oxide; perfume including starch encapsulated perfume accords, perfume microcapsules, perfume loaded zeolites, schif base reaction products of ketone perfume raw materials and polyamines, blooming perfumes, and any combination thereof; aesthetics including soap rings, lamellar aesthetic particles, geltin beads, carbonate and/or sulphate salt speckles, coloured clay, and any combination thereof: and any combination thereof.

Suitable detersive surfactants include anionic detersive surfactants, non-ionic detersive surfactant, cationic detersive surfactants, zwitterionic detersive surfactants, amphoteric detersive surfactants, and any combination thereof.

Suitable anionic detersive surfactants include sulphate and sulphonate detersive surfactants. Suitable sulphonate detersive surfactants include alkyl benzene sulphonate, such as $C_{10-13}$ alkyl benzene sulphonate. Suitable alkyl benzene sulphonate (LAS) is obtainable, or even obtained, by sulphonating commercially available linear alkyl benzene (LAB); suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. Another suitable anionic detersive surfactant is alkyl benzene sulphonate that is obtained by DETAL catalyzed process, although other synthesis routes, such as HF, may also be suitable.

Suitable sulphate detersive surfactants include alkyl sulphate, such as $C_{8-18}$ alkyl sulphate, or predominantly $C_{12}$ alkyl sulphate. The alkyl sulphate may be derived from natural sources, such as coco and/or tallow. Alternative, the alkyl sulphate may be derived from synthetic sources such as $C_{12-15}$ alkyl sulphate.

Another suitable sulphate detersive surfactant is alkyl alkoxylated sulphate, such as alkyl ethoxylated sulphate, or a $C_{8-18}$ alkyl alkoxylated sulphate, or a $C_{8-18}$ alkyl ethoxylated sulphate. The alkyl alkoxylated sulphate may have an average degree of alkoxylation of from 0.5 to 20, or from 0.5 to 10. The alkyl alkoxylated sulphate may be a $C_{8-18}$ alkyl ethoxylated sulphate, typically having an average degree of ethoxylation of from 0.5 to 10, or from 0.5 to 7, or from 0.5 to 5 or from 0.5 to 3.

The alkyl sulphate, alkyl alkoxylated sulphate and alkyl benzene sulphonates may be linear or branched, substituted or un-substituted.

The anionic detersive surfactant may be a mid-chain branched anionic detersive surfactant, such as a mid-chain branched alkyl sulphate and/or a mid-chain branched alkyl benzene sulphonate. The mid-chain branches are typically $C_{1-4}$ alkyl groups, such as methyl and/or ethyl groups.

Another suitable anionic detersive surfactant is alkyl ethoxy carboxylate.

The anionic detersive surfactants are typically present in their salt form, typically being complexed with a suitable cation. Suitable counter-ions include $Na^+$ and $K^+$, substituted ammonium such as $C_1-C_6$ alkanolammnonium such as mono-ethanolamine (MEA) tri-ethanolamine (TEA), di-ethanolamine (DEA), and any mixture thereof.

Suitable non-ionic detersive surfactants are selected from the group consisting of: $C_8-C_{18}$ alkyl ethoxylates, such as, NEODOL® non-ionic surfactants from Shell; $C_6-C_{12}$ alkyl phenol alkoxylates wherein optionally the alkoxylate units are ethyleneoxy units, propyleneoxy units or a mixture thereof; $C_{12}-C_{18}$ alcohol and $C_6-C_{12}$ alkyl phenol condensates with ethylene oxide/propylene oxide block polymers such as Pluronic® from BASF; $C_{14}$-$C_{22}$ mid-chain branched alcohols; $C_{14}$-$C_{22}$ mid-chain branched alkyl alkoxylates, typically having an average degree of alkoxylation of from 1 to 30; alkylpolysaccharides, such as alkylpolyglycosides; polyhydroxy fatty acid amides; ether capped poly(oxyalkylated) alcohol surfactants; and mixtures thereof.

Suitable non-ionic detersive surfactants are alkyl polyglucoside and/or an alkyl alkoxylated alcohol.

Suitable non-ionic detersive surfactants include alkyl alkoxylated alcohols, such as $C_{8-18}$ alkyl alkoxylated alcohol, or a $C_{8-18}$ alkyl ethoxylated alcohol. The alkyl alkoxylated alcohol may have an average degree of alkoxylation of from 0.5 to 50, or from 1 to 30, or from 1 to 20, or from 1 to 10. The alkyl alkoxylated alcohol may be a $C_{8-18}$ alkyl ethoxylated alcohol, typically having an average degree of ethoxylation of from 1 to 10, or from 1 to 7, or from 1 to 5, or from 3 to 7. The alkyl alkoxylated alcohol can be linear or branched, and substituted or un-substituted.

Suitable nonionic detersive surfactants include secondary alcohol-based detersive surfactants having the formula:

wherein $R^1$=linear or branched, substituted or unsubstituted, saturated or unsaturated $C_{2-8}$ alkyl;

wherein $R^2$=linear or branched, substituted or unsubstituted, saturated or unsaturated $C_{2-8}$ alkyl, wherein the total number of carbon atoms present in $R^1+R^2$ moieties is in the range of from 7 to 13;

wherein EO/PO are alkoxy moieties selected from ethoxy, propoxy, or mixtures thereof, optionally the EO/PO alkoxyl moieties are in random or block configuration;

wherein n is the average degree of alkoxylation and is in the range of from 4 to 10.

Other suitable non-ionic detersive surfactants include EO/PO block co-polymer surfactants, such as the Plurafac® series of surfactants available from BASF, and sugar-derived surfactants such as alkyl N-methyl glucose amide.

Suitable cationic detersive surfactants include alkyl pyridinium compounds, alkyl quaternary ammonium compounds, alkyl quaternary phosphonium compounds, alkyl ternary sulphonium compounds, and mixtures thereof.

Suitable cationic detersive surfactants are quaternary ammonium compounds having the general formula:

wherein, R is a linear or branched, substituted or unsubstituted $C_{6-18}$ alkyl or alkenyl moiety, $R_1$ and $R_2$ are independently selected from methyl or ethyl moieties, $R_3$ is a hydroxyl, hydroxymethyl or a hydroxyethyl moiety, X is an anion which provides charge neutrality, suitable anions include: halides, such as chloride; sulphate; and sulphonate. Suitable cationic detersive surfactants are mono-$C_{6-18}$ alkyl mono-hydroxyethyl di-methyl quaternary ammonium chlorides. Suitable cationic detersive surfactants are mono-$C_{8-10}$ alkyl mono-hydroxyethyl di-methyl quaternary ammonium chloride, mono-$C_{10-12}$ alkyl mono-hydroxyethyl di-methyl quaternary ammonium chloride and mono-$C_{10}$ alkyl mono-hydroxyethyl di-methyl quaternary ammonium chloride.

Suitable zwitterionic and/or amphoteric detersive surfactants include amine oxide such as dodecyldimethylamine N-oxide, alkanolamine sulphobetaines, coco-amidopropyl betaines, $HN^+$—R—$CO_2^-$ based surfactants, wherein R can be any bridging group, such as alkyl, alkoxy, aryl or amino acids.

Suitable polymers include carboxylate polymers, polyethylene glycol polymers, polyester soil release polymers such as terephthalate polymers, amine polymers, cellulosic polymers, dye transfer inhibition polymers, dye lock polymers such as a condensation oligomer produced by condensation of imidazole and epichlorhydrin, optionally in ratio of 1:4:1, hexamethylenediamine derivative polymers, and any combination thereof.

Suitable carboxylate polymers include maleate/acrylate random copolymer or polyacrylate homopolymer. The carboxylate polymer may be a polyacrylate homopolymer having a molecular weight of from 4,000 Da to 9,000 Da, or from 6,000 Da to 9,000 Da. Other suitable carboxylate polymers are co-polymers of maleic acid and acrylic acid, and may have a molecular weight in the range of from 4,000 Da to 90,000 Da.

Suitable polyethylene glycol polymers include random graft co-polymers comprising: (i) hydrophilic backbone comprising polyethylene glycol; and (ii) hydrophobic side chain(s) selected from the group consisting of: $C_4$-$C_{25}$ alkyl group, polypropylene, polybutylene, vinyl ester of a saturated $C_1$-$C_6$ mono-carboxylic acid, $C_1$-$C_6$ alkyl ester of acrylic or methacrylic acid, and mixtures thereof. Suitable polyethylene glycol polymers have a polyethylene glycol backbone with random grafted polyvinyl acetate side chains. The average molecular weight of the polyethylene glycol backbone can be in the range of from 2,000 Da to 20,000 Da, or from 4,000 Da to 8,000 Da. The molecular weight ratio of the polyethylene glycol backbone to the polyvinyl acetate side chains can be in the range of from 1:1 to 1:5, or from 1:1.2 to 1:2. The average number of graft sites per ethylene oxide units can be less than 1, or less than 0.8, the average number of graft sites per ethylene oxide units can be in the range of from 0.5 to 0.9, or the average number of graft sites per ethylene oxide units can be in the range of from 0.1 to 0.5, or from 0.2 to 0.4. A suitable polyethylene glycol polymer is Sokalan HP22.

Suitable polyester soil release polymers have a structure as defined by one of the following structures (I), (II) or (III):

wherein:

a, b and c are from 1 to 200;

d, e and f are from 1 to 50;

Ar is a 1,4-substituted phenylene;

sAr is 1,3-substituted phenylene substituted in position 5 with $SO_3Me$;

Me is H, Na, Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or any mixture thereof;

$R^1$, $R^2$, $R^3$, $R^4$, $R^5$ and $R^6$ are independently selected from H or $C_1$-$C_{18}$ n- or iso-alkyl; and $R^7$ is a linear or branched $C_1$-$C_{18}$ alkyl, or a linear or branched $C_2$-$C_{30}$ alkenyl, or a cycloalkyl group with 5 to 9 carbon atoms, or a $C_8$-$C_{30}$ aryl group, or a $C_6$-$C_{30}$ arylalkyl group. Suitable polyester soil release polymers are terephthalate polymers having the structure of formula (I) or (II) above.

Suitable polyester soil release polymers include the Repel-o-tex series of polymers such as Repel-o-tex SF2 (Rhodia) and/or the Texcare series of polymers such as Texcare SRA300 (Clariant).

Suitable amine polymers include polyethylene imine polymers, such as alkoxylated polyalkyleneimines, optionally comprising a polyethylene and/or polypropylene oxide block.

The composition can comprise cellulosic polymers, such as polymers selected from alkyl cellulose, alkyl alkoxyalkyl cellulose, carboxyalkyl cellulose, alkyl carboxyalkyl, and any combination thereof. Suitable cellulosic polymers are selected from carboxymethyl cellulose, methyl cellulose, methyl hydroxyethyl cellulose, methyl carboxymethyl cellulose, and mixtures thereof. The carboxymethyl cellulose can have a degree of carboxymethyl substitution from 0.5 to 0.9 and a molecular weight from 100,000 Da to 300,000 Da. Another suitable cellulosic polymer is hydrophobically modified carboxymethyl cellulose, such as Finnfix SH-1 (CP Kelco).

Other suitable cellulosic polymers may have a degree of substitution (DS) of from 0.01 to 0.99 and a degree of blockiness (DB) such that either DS+DB is of at least 1.00 or DB+2DS−DS$^2$ is at least 1.20. The substituted cellulosic polymer can have a degree of substitution (DS) of at least 0.55. The substituted cellulosic polymer can have a degree of blockiness (DB) of at least 0.35. The substituted cellulosic polymer can have a DS+DB, of from 1.05 to 2.00. A suitable substituted cellulosic polymer is carboxymethylcellulose.

Another suitable cellulosic polymer is cationically modified hydroxyethyl cellulose.

Suitable dye transfer inhibitor (DTI) polymers include polyvinyl pyrrolidone (PVP), vinyl co-polymers of pyrrolidone and imidazoline (PVPVI), polyvinyl N-oxide (PVNO), and any mixture thereof.

Suitable polymers includehexamethylenediamine derivative polymers, typically having the formula:

wherein X$^-$ is a suitable counter-ion, for example chloride, and R is a poly(ethylene glycol) chain having an average degree of ethoxylation of from 20 to 30. Optionally, the poly(ethylene glycol) chains may be independently capped with sulphate and/or sulphonate groups, typically with the charge being balanced by reducing the number of X$^-$ counter-ions, or (in cases where the average degree of sulphation per molecule is greater than two), introduction of Y$^+$ counter-ions, for example sodium cations.

Suitable builders include zeolites, phosphates, citrates, and any combination thereof.

The composition may be substantially free of zeolite builder. Substantially free of zeolite builder typically means comprises from 0 wt % to 10 wt %, zeolite builder, or to 8 wt %, or to 6 wt %, or to 4 wt %, or to 3 wt %, or to 2 wt %, or even to 1 wt % zeolite builder. Substantially free of zeolite builder preferably means "no deliberately added" zeolite builder. Typical zeolite builders include zeolite A, zeolite P, zeolite MAP, zeolite X and zeolite Y.

The composition may be substantially free of phosphate builder. Substantially free of phosphate builder typically means comprises from 0 wt % to 10 wt % phosphate builder, or to 8 wt %, or to 6 wt %, or to 4 wt %, or to 3 wt %, or to 2 wt %, or even to 1 wt % phosphate builder. Substantially free of zeolite builder preferably means "no deliberately added" phosphate builder. A typical phosphate builder is sodium tri-polyphosphate (STPP).

A suitable citrate is sodium citrate. However, citric acid may also be incorporated into the composition, which can form citrate in the wash liquor.

Suitable buffers and alkalinity sources include carbonate salts and/or silicate salts and/or double salts such as burkeitte.

A suitable carbonate salt is sodium carbonate and/or sodium bicarbonate. The composition may comprise bicarbonate salt. It may be suitable for the composition to comprise low levels of carbonate salt, for example, it may be suitable for the composition to comprise from 0 wt % to 10 wt % carbonate salt, or to 8 wt %, or to 6 wt %, or to 4 wt %, or to 3 wt %, or to 2 wt %, or even to 1 wt % carbonate salt. The composition may even be substantially free of carbonate salt; substantially free means "no deliberately added".

The carbonate salt may have a weight average mean particle size of from 100 to 500 micrometers. Alternatively, the carbonate salt may have a weight average mean particle size of from 10 to 25 micrometers.

The granular laundry detergent composition may comprise from 0 wt % to 20 wt % silicate salt, or to 15 wt %, or to 10 wt %, or to 5 wt %, or to 4 wt %, or even to 2 wt %, and may comprise from above 0 wt %, or from 0.5 wt %, or even from 1 wt % silicate salt. The silicate can be crystalline or amorphous. Suitable crystalline silicates include crystalline layered silicate, such as SKS-6. Other suitable silicates include 1.6R silicate and/or 2.0R silicate. A suitable silicate salt is sodium silicate. Another suitable silicate salt is sodium metasilicate.

The granular laundry detergent composition may comprise from 0 wt % to 70% filler. Suitable fillers include sulphate salts and/or bio-filler materials.

A suitable sulphate salt is sodium sulphate. The sulphate salt may have a weight average mean particle size of from 100 to 500 micrometers, alternatively, the sulphate salt may have a weight average mean particle size of from 10 to 45 micrometers.

A suitable bio-filler material is alkali and/or bleach treated agricultural waste.

The granular laundry detergent composition may comprise bleach. Alternatively, the composition may be substantially free of bleach; substantially free means "no deliberately added". Suitable bleach includes bleach activators, sources of available oxygen, pre-formed peracids, bleach catalysts, reducing bleach, and any combination thereof. If present, the bleach, or any component thereof, for example the pre-formed peracid, may be coated, such as encapsulated, or clathrated, such as with urea or cyclodextrin.

Suitable bleach activators include: tetraacetylethylenediamine (TAED); oxybenzene sulphonates such as nonanoyl oxybenzene sulphonate (NOBS), caprylamidononanoyl oxybenzene sulphonate (NACA-OBS), 3,5,5-trimethyl hexanoyloxybenzene sulphonate (Iso-NOBS), dodecyl oxybenzene sulphonate (LOBS), and any mixture thereof; caprolactams; pentaacetate glucose (PAG); nitrile quaternary ammonium; imide bleach activators, such as N-nonanoyl-N-methyl acetamide; and any mixture thereof.

A suitable source of available oxygen (AvOx) is a source of hydrogen peroxide, such as percarbonate salts and/or perborate salts, such as sodium percarbonate. The source of peroxygen may be at least partially coated, or even completely coated, by a coating ingredient such as a carbonate salt, a sulphate salt, a silicate salt, borosilicate, or any mixture thereof, including mixed salts thereof. Suitable percarbonate salts can be prepared by a fluid bed process or by a crystallization process. Suitable perborate salts include sodium perborate mono-hydrate (PB1), sodium perborate tetra-hydrate (PB4), and anhydrous sodium perborate which is also known as fizzing sodium perborate. Other suitable sources of AvOx include persulphate, such as oxone. Another suitable source of AvOx is hydrogen peroxide.

A suitable pre-formed peracid is N,N-pthaloylamino peroxycaproic acid (PAP).

Suitable bleach catalysts include oxaziridinium-based bleach catalysts, transition metal bleach catalysts and bleaching enzymes.

A suitable oxaziridinium-based bleach catalyst has the formula:

wherein: $R^1$ is selected from the group consisting of: H, a branched alkyl group containing from 3 to 24 carbons, and a linear alkyl group containing from 1 to 24 carbons; $R^1$ can be a branched alkyl group comprising from 6 to 18 carbons, or a linear alkyl group comprising from 5 to 18 carbons, $R^1$ can be selected from the group consisting of: 2-propylheptyl, 2-butyloctyl, 2-pentylnonyl, 2-hexyldecyl, n-hexyl, n-octyl, n-decyl, n-dodecyl, n-tetradecyl, n-hexadecyl, n-octadecyl, iso-nonyl, iso-decyl, iso-tridecyl and iso-pentadecyl; $R^2$ is independently selected from the group consisting of: H, a branched alkyl group comprising from 3 to 12 carbons, and a linear alkyl group comprising from 1 to 12 carbons; optionally $R^2$ is independently selected from H and methyl groups; and n is an integer from 0 to 1.

The granular laundry detergent composition may include transition metal bleach catalyst, typically comprising copper, iron, titanium, ruthenium, tungsten, molybdenum, and/or manganese cations. Suitable transition metal bleach catalysts are manganese-based transition metal bleach catalysts.

The composition may comprise a reducing bleach. However, the composition may be substantially free of reducing bleach; substantially free means "no deliberately added". Suitable reducing bleach include sodium sulphite and/or thiourea dioxide (TDO).

The granular laundry detergent composition may comprise a co-bleach particle. Typically, the co-bleach particle comprises a bleach activator and a source of peroxide. It may be highly suitable for a large amount of bleach activator relative to the source of hydrogen peroxide to be present in the co-bleach particle. The weight ratio of bleach activator to source of hydrogen peroxide present in the co-bleach particle can be at least 0.3:1, or at least 0.6:1, or at least 0.7:1, or at least 0.8:1, or at least 0.9:1, or at least 1.0:1.0, or even at least 1.2:1 or higher.

The co-bleach particle can comprise: (i) bleach activator, such as TAED; and (ii) a source of hydrogen peroxide, such as sodium percarbonate. The bleach activator may at least partially, or even completely, enclose the source of hydrogen peroxide.

The co-bleach particle may comprise a binder. Suitable binders are carboxylate polymers such as polyacrylate polymers, and/or surfactants including non-ionic detersive surfactants and/or anionic detersive surfactants such as linear $C_{11}$-$C_{13}$ alkyl benzene sulphonate.

The co-bleach particle may comprise bleach catalyst, such as an oxaziridium-based bleach catalyst.

Suitable chelants are selected from: diethylene triamine pentaacetate, diethylene triamine penta(methyl phosphonic acid), ethylene diamine-N'N'-disuccinic acid, ethylene diamine tetraacetate, ethylene diamine tetra(methylene phosphonic acid), hydroxyethane di(methylene phosphonic acid), and any combination thereof. A suitable chelant is ethylene diamine-N'N'-disuccinic acid (EDDS) and/or hydroxyethane diphosphonic acid (HEDP). The laundry detergent composition may comprise ethylene diamine-N'N'-disuccinic acid or salt thereof. The ethylene diamine-N'N'-disuccinic acid may be in S,S enantiomeric form. The composition may comprise 4,5-dihydroxy-m-benzenedisulfonic acid disodium salt. Suitable chelants may also be calcium crystal growth inhibitors.

The granular laundry detergent composition may comprise a calcium carbonate crystal growth inhibitor, such as one selected from the group consisting of: 1-hydroxyethanediphosphonic acid (HEDP) and salts thereof; N,N-dicarboxymethyl-2-aminopentane-1,5-dioic acid and salts thereof; 2-phosphonobutane-1,2,4-tricarboxylic acid and salts thereof; and any combination thereof.

Suitable photobleaches are zinc and/or aluminium sulphonated phthalocyanines.

The hueing agent (also defined herein as hueing dye) is typically formulated to deposit onto fabrics from the wash liquor so as to improve fabric whiteness perception. The hueing agent is typically blue or violet. It may be suitable that the hueing dye(s) have a peak absorption wavelength of from 550 nm to 650 nm, or from 570 nm to 630 nm. The hueing agent may be a combination of dyes which together have the visual effect on the human eye as a single dye having a peak absorption wavelength on polyester of from 550 nm to 650 nm, or from 570 nm to 630 nm. This may be provided for example by mixing a red and green-blue dye to yield a blue or violet shade.

Dyes are typically coloured organic molecules which are soluble in aqueous media that contain surfactants. Dyes maybe selected from the classes of basic, acid, hydrophobic, direct and polymeric dyes, and dye-conjugates. Suitable polymeric hueing dyes are commercially available, for example from Milliken, Spartanburg, South Carolina, USA.

Examples of suitable dyes are violet DD, direct violet 7, direct violet 9, direct violet 11, direct violet 26, direct violet 31, direct violet 35, direct violet 40, direct violet 41, direct violet 51, direct violet 66, direct violet 99, acid violet 50, acid blue 9, acid violet 17, acid black 1, acid red 17, acid blue 29, solvent violet 13, disperse violet 27 disperse violet 26, disperse violet 28, disperse violet 63 and disperse violet 77, basic blue 16, basic blue 65, basic blue 66, basic blue 67, basic blue 71, basic blue 159, basic violet 19, basic violet 35, basic violet 38, basic violet 48; basic blue 3, basic blue 75, basic blue 95, basic blue 122, basic blue 124, basic blue 141, thiazolium dyes, reactive blue 19, reactive blue 163, reactive blue 182, reactive blue 96, Liquitint® Violet CT (Milliken, Spartanburg, USA) and Azo-CM-Cellulose (Megazyme, Bray, Republic of Ireland). Other suitable hueing agents are hueing dye-photobleach conjugates, such as the conjugate of sulphonated zinc phthalocyanine with direct violet 99. A particularly suitable hueing agent is a combination of acid red 52 and acid blue 80, or the combination of direct violet 9 and solvent violet 13.

Suitable brighteners are stilbenes, such as brightener 15. Other suitable brighteners are hydrophobic brighteners, and brightener 49. The brightener may be in micronized particulate form, having a weight average particle size in the range of from 3 to 30 micrometers, or from 3 micrometers to 20 micrometers, or from 3 to 10 micrometers. The brightener can be alpha or beta crystalline form.

Suitable enzymes include proteases, amylases, cellulases, lipases, xylogucanases, pectate lyases, mannanases, bleaching enzymes, cutinases, and mixtures thereof.

For the enzymes, accession numbers and IDs shown in parentheses refer to the entry numbers in the databases Genbank, EMBL and/or Swiss-Prot. For any mutations, standard 1-letter amino acid codes are used with a * representing a deletion. Accession numbers prefixed with DSM refer to micro-organisms deposited at Deutsche Sammlung von Mikroorganismen and Zellkulturen GmbH, Mascheroder Weg 1b, 38124 Brunswick (DSMZ).

Suitable proteases include metalloproteases and/or serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:

(a) subtilisins (EC 3.4.21.62), including those derived from *Bacillus*, such as *Bacillus lentus, Bacillus alkalophilus* (P27963, ELYA_BACAO), *Bacillus subtilis, Bacillus amyloliquefaciens* (P00782, SUBT_BACAM), *Bacillus pumilus* (P07518) and *Bacillus gibsonii* (DSM14391).

(b) trypsin-type or chymotrypsin-type proteases, such as trypsin (e.g. of porcine or bovine origin), including the *Fusarium* protease and the chymotrypsin proteases derived from *Cellumonas* (A2RQE2).

(c) metalloproteases, including those derived from *Bacillus amyloliquefaciens* (P06832, NPRE_BACAM).

Suitable proteases include those derived from *Bacillus gibsonii* or *Bacillus lentus* such as subtilisin 309 (P29600) and/or DSM 5483 (P29599).

Suitable commercially available protease enzymes include: those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase® and Esperase® by Novozymes A/S (Denmark); those sold under the tradename Maxatase®, Maxacal®, Maxapem®, Properase®, Purafect®, Purafect Prime®, Purafect Ox®, FN3®, FN4®, Excellase® and Purafect OXP® by Genencor International; those sold under the tradename Opticlean® and Optimase® by Solvay Enzymes; those available from Henkel/Kemira, namely BLAP (P29599 having the following mutations S99D+S101 R+S103A+V104I+G159S), and variants thereof including BLAP R (BLAP with S3T+V4I+V199M+V205I+L217D), BLAP X (BLAP with S3T+V4I+V205I) and BLAP F49 (BLAP with S3T+V4I+A194P+V199M+V205I+L217D) all from Henkel/Kemira; and KAP (*Bacillus alkalophilus* subtilisin with mutations A230V+S256G+S259N) from Kao.

Suitable amylases are alpha-amylases, including those of bacterial or fungal origin. Chemically or genetically modified mutants (variants) are included. A suitable alkaline alpha-amylase is derived from a strain of *Bacillus*, such as *Bacillus licheniformis, Bacillus amyloliquefaciens, Bacillus stearothermophilus, Bacillus subtilis*, or other *Bacillus sp.*, such as *Bacillus sp.* NCIB 12289, NCIB 12512, NCIB 12513, sp 707, DSM 9375, DSM 12368, DSMZ no. 12649, KSM AP1378, KSM K36 or KSM K38. Suitable amylases include:

(a) alpha-amylase derived from *Bacillus licheniformis* (P06278, AMY_BACLI), and variants thereof, especially the variants with substitutions in one or more of the following positions: 15, 23, 105, 106, 124, 128, 133, 154, 156, 181, 188, 190, 197, 202, 208, 209, 243, 264, 304, 305, 391, 408, and 444.

(b) AA560 amylase (CBU30457, HD066534) and variants thereof, especially the variants with one or more substitutions in the following positions: 26, 30, 33, 82, 37, 106, 118, 128, 133, 149, 150, 160, 178, 182, 186, 193, 203, 214, 231, 256, 257, 258, 269, 270, 272, 283, 295, 296, 298, 299, 303, 304, 305, 311, 314, 315, 318, 319, 339, 345, 361, 378, 383, 419, 421, 437, 441, 444, 445, 446, 447, 450, 461, 471, 482, 484, optionally that also contain the deletions of D183* and G184*.

(c) variants exhibiting at least 90% identity with the wild-type enzyme from *Bacillus* SP722 (CBU30453, HD066526), especially variants with deletions in the 183 and 184 positions.

Suitable commercially available alpha-amylases are Duramyl®, Liquezyme® Termamyl®, Termamyl Ultra®, Natalase®, Supramyl®, Stainzyme®, Stainzyme Plus®, Fungamyl® and BAN® (Novozymes A/S), Bioamylase® and variants thereof (Biocon India Ltd.), Kemzym® AT 9000 (Biozym Ges. m.b.H, Austria), Rapidase®, Purastar®, Optisize HT Plus®, Enzysize®, Powerase® and Purastar Oxam®, Maxamyl® (Genencor International Inc.) and KAM® (KAO, Japan). Suitable amylases are Natalase®, Stainzyme® and Stainzyme Plus®.

Suitable cellulases include those of bacterial or fungal origin. Chemically modified or protein engineered mutants are included. Suitable cellulases include cellulases from the genera *Bacillus, Pseudomonas, Humicola, Fusarium, Thielavia, Acremonium*, e.g., the fungal cellulases produced from *Humicola insolens, Myceliophthora thermophila* and *Fusarium oxysporum*.

Commercially available cellulases include Celluzyme®, and Carezyme® (Novozymes A/S), Clazinase®, and Puradax HA® (Genencor International Inc.), and KAC-500 (B)® (Kao Corporation).

The cellulase can include microbial-derived endoglucanases exhibiting endo-beta-1,4-glucanase activity (E.C. 3.2.1.4), including a bacterial polypeptide endogenous to a member of the genus *Bacillus* sp. AA349 and mixtures thereof. Suitable endoglucanases are sold under the tradenames Celluclean® and Whitezyme® (Novozymes A/S, Bagsvaerd, Denmark).

The composition may comprise a cleaning cellulase belonging to Glycosyl Hydrolase family 45 having a molecular weight of from 17 kDa to 30 kDa, for example the endoglucanases sold under the tradename Biotouch® NCD, DCC and DCL (AB Enzymes, Darmstadt, Germany).

Suitable cellulases may also exhibit xyloglucanase activity, such as Whitezyme®.

Suitable lipases include those of bacterial or fungal origin. Chemically modified or protein engineered mutants are included. Examples of useful lipases include lipases from *Humicola* (synonym *Thermomyces*), e.g., from *H. lanuginosa* (*T. lanuginosus*), or from *H. insolens*, a *Pseudomonas* lipase, e.g., from *P. alcaligenes* or *P. pseudoalcaligenes, P. cepacia, P. stutzeri, P. fluorescens, Pseudomonas* sp. strain SD 705, *P. wisconsinensis*, a *Bacillus* lipase, e.g., from *B. subtilis, B. stearothermophilus* or *B. pumilus*.

The lipase may be a "first cycle lipase", optionally a variant of the wild-type lipase from *Thermomyces lanuginosus* comprising T231R and N233R mutations. The wild-type sequence is the 269 amino acids (amino acids 23-291) of the Swissprot accession number Swiss-Prot 059952 (derived from *Thermomyces lanuginosus* (*Humicola lanuginosa*)). Suitable lipases would include those sold under the tradenames Lipex®, Lipolex® and Lipoclean® by Novozymes, Bagsvaerd, Denmark.

The composition may comprise a variant of *Thermomyces lanuginosa* (059952) lipase having >90% identity with the wild type amino acid and comprising substitution(s) at T231 and/or N233, optionally T231R and/or N233R.

Suitable xyloglucanase enzymes may have enzymatic activity towards both xyloglucan and amorphous cellulose substrates. The enzyme may be a glycosyl hydrolase (GH) selected from GH families 5, 12, 44 or 74. The glycosyl hydrolase selected from GH family 44 is particularly suitable. Suitable glycosyl hydrolases from GH family 44 are the XYG1006 glycosyl hydrolase from *Paenibacillus polyxyma* (ATCC 832) and variants thereof.

Suitable pectate lyases are either wild-types or variants of *Bacillus*-derived pectate lyases (CAF05441, AAU25568) sold under the tradenames Pectawash®, Pectaway® and X-Pect® (from Novozymes A/S, Bagsvaerd, Denmark).

Suitable mannanases are sold under the tradenames Mannaway® (from Novozymes A/S, Bagsvaerd, Denmark), and Purabrite® (Genencor International Inc., Palo Alto, California).

Suitable bleach enzymes include oxidoreductases, for example oxidases such as glucose, choline or carbohydrate oxidases, oxygenases, catalases, peroxidases, like halo-, chloro-, bromo-, lignin-, glucose- or manganese-peroxidases, dioxygenases or laccases (phenoloxidases, polyphenoloxidases). Suitable commercial products are sold under the Guardzyme® and Denilite® ranges from Novozymes. It may be advantageous for additional organic compounds, especially aromatic compounds, to be incorporated with the bleaching enzyme; these compounds interact with the bleaching enzyme to enhance the activity of the oxidoreductase (enhancer) or to facilitate the electron flow (mediator) between the oxidizing enzyme and the stain typically over strongly different redox potentials.

Other suitable bleaching enzymes include perhydrolases, which catalyse the formation of peracids from an ester substrate and peroxygen source. Suitable perhydrolases include variants of the *Mycobacterium smegmatis* perhydrolase, variants of so-called CE-7 perhydrolases, and variants of wild-type subtilisin Carlsberg possessing perhydrolase activity.

Suitable cutinases are defined by E.C. Class 3.1.1.73, optionally displaying at least 90%, or 95%, or most optionally at least 98% identity with a wild-type derived from one of *Fusarium solani, Pseudomonas mendocina* or *Humicola insolens*.

The relativity between two amino acid sequences is described by the parameter "identity". For purposes of the present invention, the alignment of two amino acid sequences is determined by using the Needle program from the EMBOSS package (http://emboss.org) version 2.8.0. The Needle program implements the global alignment algorithm described in Needleman, S. B. and Wunsch, C. D. (1970) J. Mol. Biol. 48, 443-453. The substitution matrix used is BLOSUM62, gap opening penalty is 10, and gap extension penalty is 0.5.

Suitable fabric-softening agents include clay, silicone and/or quaternary ammonium compounds. Suitable clays include montmorillonite clay, hectorite clay and/or laponite clay. A suitable clay is montmorillonite clay. Suitable silicones include amino-silicones and/or polydimethylsiloxane (PDMS). A suitable fabric softener is a particle comprising clay and silicone, such as a particle comprising montmorillonite clay and PDMS.

Suitable flocculants include polyethylene oxide; for example having an average molecular weight of from about 300,000 Da to 900,000 Da.

Suitable suds suppressors include silicone and/or fatty acid such as stearic acid.

Suitable perfumes include perfume microcapsules, polymer assisted perfume delivery systems including Schiff base perfume/polymer complexes, starch-encapsulated perfume accords, perfume-loaded zeolites, blooming perfume accords, and any combination thereof. A suitable perfume microcapsule is melamine formaldehyde based, typically comprising perfume that is encapsulated by a shell comprising melamine formaldehyde. It may be highly suitable for such perfume microcapsules to comprise cationic and/or cationic precursor material in the shell, such as polyvinyl formamide (PVF) and/or cationically modified hydroxyethyl cellulose (catHEC).

Suitable aesthetic particles include soap rings, lamellar aesthetic particles, geltin beads, carbonate and/or sulphate salt speckles, coloured clay particles, and any combination thereof.

The compositions of the present disclosure may include a conditioning active. Compositions that contain conditioning actives may provide softness, anti-wrinkle, anti-static, conditioning, anti-stretch, color, and/or appearance benefits. Conditioning actives may be present at a level of from about 1% to about 99%, by weight of the composition. The composition may include from about 1%, or from about 2%, or from about 3%, to about 99%, or to about 75%, or to about 50%, or to about 40%, or to about 35%, or to about 30%, or to about 25%, or to about 20%, or to about 15%, or to about 10%, by weight of the composition, of conditioning active. The composition may include from about 5% to about 30%, by weight of the composition, of conditioning active.

Conditioning actives suitable for compositions of the present disclosure may include quaternary ammonium ester compounds, silicones, non-ester quaternary ammonium compounds, amines, fatty esters, sucrose esters, silicones, dispersible polyolefins, polysaccharides, fatty acids, softening or conditioning oils, polymer latexes, or combinations thereof.

The composition may include a quaternary ammonium ester compound, a silicone, or combinations thereof, preferably a combination. The combined total amount of quaternary ammonium ester compound and silicone may be from about 5% to about 70%, or from about 6% to about 50%, or from about 7% to about 40%, or from about 10% to about 30%, or from about 15% to about 25%, by weight of the composition. The composition may include a quaternary ammonium ester compound and silicone in a weight ratio of from about 1:10 to about 10:1, or from about 1:5 to about 5:1, or from about 1:3 to about 1:3, or from about 1:2 to about 2:1, or about 1:1.5 to about 1.5:1, or about 1:1.

The composition may contain mixtures of different types of conditioning actives. The compositions of the present disclosure may contain a certain conditioning active but be substantially free of others. For example, the composition may be free of quaternary ammonium ester compounds, silicones, or both. The composition may comprise quaternary ammonium ester compounds but be substantially free of silicone. The composition may comprise silicone but be substantially free of quaternary ammonium ester compounds.

Examples of suitable quaternary ammonium ester compound are commercially available from Evonik under the tradename Rewoquat WE18 and/or Rewoquat WE20, and from Stepan under the tradename Stepantex GA90, Stepantex VK90, and/or Stepantex VL90A. A further example of a suitable quaternary ammonium ester material may comprise a mixture of: bis-(2-hydroxypropyl)-dimethylammonium methylsulfate fatty acid ester; (2-hydroxypropyl)-(1-methyl-2-hydroxyethyl)-dimethylammonium methylsulfate fatty acid ester; and bis-(1-methyl-2-hydroxyethyl)-dimethylammonium methylsulfate fatty acid ester; where the fatty acid esters are produced from a $C_{12}$-$C_{18}$ fatty acid mixture.

Process for Laundering Fabrics

Another aspect of the present invention is a process for laundering fabrics, comprising the steps of;
a. providing an automatic laundry washing machine wherein the automatic laundry washing machine comprises a drum and a drawer;
b. adding the water-soluble unit dose article according to the present invention to the drawer, the drum or a mixture thereof together with fabrics to be washed to the drum;
c. starting a wash operation in the automatic laundry washing machine.

Preferably, the water-soluble unit dose article is added to sufficient water to dilute the liquid laundry detergent composition by a factor of at least 300 fold to create a wash liquor and contacting fabrics to be washed with said wash liquor in the drum of the washing machine. Without wishing to be bound by theory, when the water-soluble unit dose article is added to water, the water-soluble film dissolves releasing the internal liquid laundry detergent composition into the water. The liquid laundry detergent composition disperses in the water to create the wash liquor.

Preferably the wash liquor may comprise between 1 L and 64 L, preferably between 2 L and 32 L, more preferably between 3 L and 20 L of water.

Preferably, the wash liquor is at a temperature of between 5° C. and 90° C., preferably between 10° C. and 60° C., more preferably between 12° C. and 45° C., most preferably between 15° C. and 40° C.

Preferably, washing the fabrics in the wash liquor takes between 5 minutes and 50 minutes, preferably between 5 minutes and 40 minutes, more preferably between 5 minutes and 30 minutes, even more preferably between 5 minutes and 20 minutes, most preferably between 6 minutes and 18 minutes to complete.

Preferably, the wash liquor comprises between 1 kg and 20 kg, preferably between 3 kg and 15 kg, most preferably between 5 and 10 kg of fabrics.

The wash liquor may comprise water of any hardness preferably varying between 0 gpg to 40 gpg.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

EXAMPLES

The residue profile of pouches made from two different sheets consisting of polyvinyl alcohol is measured in a front-loading washing machine/granular detergent context. The two film sheets are summarized in the table below. For Nonwoven sheets, purchased PVOH fibres were converted into nonwoven sheet by JIANGSU WISDOM NONWOVEN CO. LTD, Address: No. 19 RenMinDong Road, Wu Jin, Changzhou, Jiangsu, China.

| 1 | Film 1 | 5 wt % PEG600 gel-breaker PvOH homopolymer, 100-120 kDa, degree of hydrolysis 86-89% |
| 2 | Film 2 | 5 wt % PEG600 gel-breaker PvOH homopolymer, 30-50 kDa, degree of hydrolysis 86-89% |

Making Unit Dose Article

The appropriate sheet is cut 240 mm (long edge) by 100 mm (short edge). The sheet is then folded over each other along the long edge so to form a two-layer edge. Place the two-layer edge on the heating element of an impulse sealer (Impulse Sealer model TISH-300 from TEW Electric Heating Equipment CO., LTD, 7F, No. 140, Sec. 2, Nan Kang Road, Taipei, Taiwan). The position of the layers on the heating element should be where a side closure seam is to be created. Close the sealer arm for 1 second to seal the two layers together now forming a cylinder of the sheet. In a similar way, seal either the top or bottom of the sides of the cylinder to create an additional side closure seal. With the two sides sealed, the sheet forms an open container. Next add the appropriate amount of powder into the open container and then seal the last side to create the last side closure seam. A unit dose article is now formed. For most sheets which are less than 0.3 mm thick, heating dial setting 4 and heat time 1 second is used. Depending on the sheet material, heating temperature and heating time might have to be adjusted to realise a desirable seam. If the temperature is too low or heating time is not long enough, the sheet material may not sufficiently melt and the two layers come apart easily; if the temperature is too high or the heating time is too long, pin holes may form at the sealed edge. One should adjust the sealing equipment conditions so the layers melt and form a seam but not introduce negatives such as pin holes on the seam edge.

The same making procedure was used for all the film samples tested in the examples.

Granular Detergent Composition:

Spray-dried laundry detergent powder was prepared using standard methods according to the composition presented in table 1 (parts by weight).

TABLE 1

| | |
|---|---|
| C8-C24 alkyl benzene sulphonate | 22.72 |
| Acrylate/maleate copolymer | 15.25 |
| Sodium Carbonate | 30.15 |
| Sodium Sulphate | 22.84 |
| Sodium Silicate | 5.00 |
| Water | 2.50 |
| Misc. | Balance |
| Total | 100.00 |

Granular laundry detergent composition according table 2 (parts by weight) was prepared by dry mixing, in a batch rotary mixer, with non-ionic fluid sprayed and dispersed onto the laundry composition.

TABLE 2

| | % |
|---|---|
| Spray dried powder according to table 1 | 12.52 |
| Aluminosilicate | 3.92 |
| Di-styryl biphenyl optical brightener | 0.3 |
| Hydroxyethane diphosphonic acid | 0.45 |
| LAS Agglomerate (33% active Alkyl benzene sulphonate/Sodium carbonate) | 57.0 |
| AES Agglomerate (45% active co-particle of alkyl ethoxylated sulphate/Sodium carbonate) | 4.2 |
| Sodium percarbonate (having from 12% to 15% active AvOx) | 16.15 |
| Tetraacetyl ethylene diamine agglomerate (92 wt % active) | 3.70 |
| Ethoxylated C12-C18 alcohol having an average degree of ethoxylation of 7 (AE7) | 0.3 |
| Detersive enzymes covering Protease/lipase/amylase/mannanase | 0.86 |
| Carboxymethyl cellulose | 0.62 |
| Misc. | Balance |
| Total | 100.00 |

Test Protocol:

The test protocol below was followed to determine the residue profiles of the pouches produced.

Washing machine used is a Miele 1724 machine

Inlet water temperature is controlled at 20° C./source local municipal water

One pouch is introduced into drum at rear the washing machine 3 kg of fabric load added into the washing machine. Fabrics are standard global cotton ballast 4 SBL 2000 sheets added Washing machine cycle used is an express wash; 30 min/30° C. cycle selected There are two evaluation measures considered to quantify the residue profile in the machine.

1. During wash measure—
   a. The washing cycle is stopped after 10 minutes
   b. Any residue from front door seal area is collected.
   c. Any collected residues are place in 40° C. drying cabinet for 24 hrs
   d. The dried residues are weighed, and a gravimetrical measure is recorded. This measure indicates the level of undissolved residue that exist at this stage of the washing machine.

2. End wash measure—
   a. The washing cycle is left any completed.
   b. Any residue from front door seal area is collected.
   c. Any collected residues are place in 40° C. drying cabinet for 24 hrs
   d. The dried residues are weighed, and a gravimetrical measure is recorded. This measure indicates the level of undissolved residue that exist at this stage of the washing machine.

Test Results:

The table 3 below summarizes the dispensing draw residue profile for the 3 different test films.

TABLE 3

| Film | During wash measure Residue Weight (g) | End wash measure Residue Weight (g) | Residue Description |
|---|---|---|---|
| Film 1 | 40 | 20 | Gelatinous residues observed on fabrics. Residues on wash machine door seals. |
| Film 2 | 0 | 0 | No visible residues present |

From the data it can clearly be seen that film 2, produced from low molecular weight PVOH according to the invention provides superior residue profile during and at the end of the cycle. The other film sheet (Film 1) outside of the invention resulted in significant levels of residues left during and at the end of the cycle.

What is claimed is:

1. A water-soluble unit dose article comprising a water-soluble fibrous non-woven sheet and a granular laundry detergent composition, wherein the granular laundry detergent composition comprises at least a first plurality of particles;
   wherein the water-soluble fibrous non-woven sheet is shaped to form a sealed internal compartment in between one or more of the water-soluble fibrous non-woven sheets by sealing one or more of the water-soluble fibrous non-woven sheets together along one or more seal regions, wherein the granular laundry detergent composition is within said sealed internal compartment; and
   wherein the water-soluble fibrous non-woven sheet comprises a plurality of fibers;
   wherein the fibers comprise a polyvinyl alcohol polymer, and wherein the polyvinyl alcohol polymer has an average molecular weight of about 70 kDa or less; and
   wherein the fibers comprise a gel-breaker, and wherein the gel-breaker is polyethylene glycol having a molecular weight of between about 100 and about 800.

2. The water-soluble unit dose article according to claim 1, wherein the polyvinyl alcohol polymer has an average molecular weight of between about 5 kDa and about 70 kDa, or between about 7 kDa and about 65 kDa, or between about 10 kDa and about 60 kDa.

3. The water-soluble unit dose article according to claim 1, wherein the fibers comprise between about 0.1% and about 15%, or between about 1% and about 12%, or between about 2% and about 10% by weight of the fibers of the gel-breaker.

4. The water-soluble unit dose article according to claim 1, wherein the fibers are present between about 80% and about 95%, or between about 85% and about 93%, or between about 87% and about 90% by weight of the water-soluble fibrous non-woven sheet.

5. The water-soluble unit dose article according to claim 1, wherein the water-soluble fibrous non-woven sheet comprises a second plurality of particles.

6. The water-soluble unit dose article according to claim 5, wherein the second plurality of particles are present between about 0.25% and about 10%, or between about 0.5% and about 5%, or between about 1% and about 3% by weight of the water-soluble fibrous non-woven sheet.

7. The water-soluble unit dose article according to claim 5, wherein the second plurality of particles comprise zeolite, inorganic salts, surfactant granules or a mixture thereof.

8. The water-soluble unit dose article according claim 1, wherein the fibers comprise less than about 5%, or less than about 3%, or less than about 2% by weight of the fibers of water.

9. The water-soluble unit dose article according claim 1, wherein the water-soluble fibrous non-woven sheet has a basis weight of between about 20 gsm and about 60 gsm, or between about 20 gsm and about 55 gsm or between about 25 gsm and about 50 gsm, or between about 25 gsm and about 45 gsm.

10. The water-soluble unit dose article according to claim 1, wherein the polyvinyl alcohol polymer is a polyvinyl alcohol homopolymer.

11. The water-soluble unit dose article according to claim 10, wherein the polyvinyl alcohol homopolymer has an average percentage degree of hydrolysis of from about 65% to about 100%.

12. The water-soluble unit dose article according to claim 1, wherein the first plurality of particles comprise anionic detersive surfactants, non-ionic detersive surfactants, cationic detersive surfactants, zwitterionic detersive surfactants, amphoteric detersive surfactants, carboxylate polymers, polyethylene glycol polymers, terephthalate polymers, amine polymers, cellulosic polymers, dye transfer inhibition polymers, dye lock polymers, hexamethylenediamine derivative polymers, zeolites, phosphates, citrate, carbonate salt, silicate salts, sulphate salts, bio-filler materials, bleach activators, sources of available oxygen, pre-formed peracids, bleach catalysts, reducing bleach, chelants, photobleach, hueing agents, brighteners, proteases, amylases, cellulases, lipases, xylogucanases, pectate lyases, mannanases, bleaching enzymes, cutinases, clay, silicones, quaternary ammonium fabric-softening agents, polyethylene oxide, perfume, starch encapsulated perfume accords, perfume microcapsules, perfume loaded zeolites, schif base reaction products of ketone perfume raw materials and polyamines, blooming perfumes, soap rings, lamellar aesthetic particles, gelatin beads, carbonate and/or sulphate salt speckles, coloured clay, and any combination thereof.

13. The water-soluble unit dose article according to claim 1, wherein the first plurality of particles comprise blown powder particles, agglomerated particles, extruded particles, enzyme prills or a mixture thereof.

14. A process for laundering fabrics, comprising the steps of:
  a. providing an automatic laundry washing machine wherein the automatic laundry washing machine comprises a drum and a drawer;
  b. adding the water-soluble unit dose article according to claim 1 to the drawer, the drum or a mixture thereof and adding fabrics to be washing to the drum;
  c. starting a wash operation in the automatic laundry washing machine.

15. A water-soluble unit dose article comprising:
  one or more water-soluble fibrous non-woven sheets comprising water-soluble fibers;
  a granular laundry detergent composition comprising at least a first plurality of particles; and
  a sealed internal compartment bounded by one or more water-soluble fibrous non-woven sheets and one or more sealed regions;
  wherein the granular laundry detergent composition is within said sealed internal compartment; and
  wherein the water-soluble fibers comprise a polyvinyl alcohol polymer, and wherein the polyvinyl alcohol polymer has an average molecular weight of about 70 kDa or less; and
  wherein the water-soluble fibers comprise a gel-breaker, and wherein the gel-breaker is polyethylene glycol having a molecular weight of between about 100 and about 800.

16. The water-soluble unit dose article according to claim 15, wherein the polyvinyl alcohol polymer has an average molecular weight of between about 5 kDa and about 70 kDa, or between about 7 kDa and about 65 kDa, or between about 10 kDa and about 60 kDa.

17. The water-soluble unit dose article according to claim 15, wherein the water-soluble fibers comprise between about 0.1% and about 15%, or between about 1% and about 12%, or between about 2% and about 10% by weight of the water-soluble fibers of the gel-breaker.

18. The water-soluble unit dose article according to claim 15, wherein the water-soluble fibers are present between about 80% and about 95%, or between about 85% and about 93%, or between about 87% and about 90% by weight of the water-soluble fibrous non-woven sheet.

19. The water-soluble unit dose article according to claim 15, wherein the water-soluble fibrous non-woven sheet comprises a second plurality of particles.

20. The water-soluble unit dose article according to claim 19, wherein the second plurality of particles are present between about 0.25% and about 10%, or between about 0.5% and about 5%, or between about 1% and about 3% by weight of the water-soluble fibrous non-woven sheet.

* * * * *